United States Patent
Swenson et al.

(10) Patent No.: US 7,366,935 B1
(45) Date of Patent: Apr. 29, 2008

(54) HIGH SPEED BUS WITH ALIGNMENT, RE-TIMING AND BUFFER UNDERFLOW/OVERFLOW DETECTION ENHANCEMENTS

(75) Inventors: Erik R. Swenson, San Jose, CA (US); Sid Khattar, Thousand Oaks, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 445 days.

(21) Appl. No.: 10/405,961

(22) Filed: Apr. 1, 2003

(51) Int. Cl.
*G06F 1/12* (2006.01)

(52) U.S. Cl. .................. 713/400; 713/500; 713/502; 713/600; 713/400; 345/558; 345/559; 365/233

(58) Field of Classification Search .............. 713/400
See application file for complete search history.

(56) References Cited

U.S. PATENT DOCUMENTS

| | | | | |
|---|---|---|---|---|
| 4,748,588 A * | 5/1988 | Norman et al. ............. 713/400 |
| 4,974,225 A * | 11/1990 | Chenier et al. ............. 370/509 |
| 5,392,422 A * | 2/1995 | Hoel et al. .................. 710/113 |
| 5,428,649 A * | 6/1995 | Cecchi ........................ 375/372 |
| 5,655,113 A * | 8/1997 | Leung et al. ............... 713/401 |
| 5,737,535 A | 4/1998 | Bagley et al. |
| 5,872,823 A * | 2/1999 | Sutton ........................ 375/372 |
| 5,884,099 A * | 3/1999 | Klingelhofer ............... 710/52 |
| 5,905,766 A * | 5/1999 | Nguyen ...................... 375/354 |
| 5,919,265 A * | 7/1999 | Nishtala et al. ............. 713/400 |
| 6,034,957 A | 3/2000 | Haddock et al. |
| 6,078,546 A * | 6/2000 | Lee ............................. 365/233 |
| 6,295,299 B1 | 9/2001 | Haddock et al. |
| 6,366,991 B1 * | 4/2002 | Manning .................... 711/167 |
| 6,380,978 B1 * | 4/2002 | Adams et al. .............. 348/452 |
| 6,400,785 B1 * | 6/2002 | Sunaga et al. .............. 375/372 |
| 6,445,642 B2 * | 9/2002 | Murakami .................. 365/233 |
| 6,594,329 B1 * | 7/2003 | Susnow ...................... 375/372 |
| 6,603,706 B1 * | 8/2003 | Nystuen et al. ............. 365/233 |
| 6,640,277 B1 * | 10/2003 | Moertl ........................ 710/305 |
| 6,680,990 B1 * | 1/2004 | Yoshida et al. ............. 375/372 |
| 6,700,409 B2 * | 3/2004 | Parkin ......................... 326/93 |
| 6,738,880 B2 * | 5/2004 | Lai et al. .................... 711/167 |
| 6,807,125 B2 * | 10/2004 | Coteus et al. ............... 365/233 |
| 6,928,528 B1 * | 8/2005 | Hewitt ........................ 711/156 |
| 6,937,680 B2 * | 8/2005 | Fong et al. ................. 375/357 |
| 6,946,873 B1 * | 9/2005 | Sendrovitz .................. 326/41 |
| 2003/0058977 A1 * | 3/2003 | Czekaj et al. ............... 375/354 |
| 2003/0063684 A1 * | 4/2003 | Czekaj et al. ............... 375/295 |
| 2003/0081713 A1 * | 5/2003 | Pontius et al. .............. 375/372 |
| 2004/0057542 A1 * | 3/2004 | Knapp et al. ............... 375/355 |

OTHER PUBLICATIONS

Van Ess, D., *A Circular FIFO, PsoC Style*, Cypress Microsystems, Application Note AN2036, Rev. B, pp. 1-5, Jun. 21, 2002.

* cited by examiner

*Primary Examiner*—Nitin C. Patel
(74) *Attorney, Agent, or Firm*—Howrey LLP

(57) ABSTRACT

In a networked system in which high speed busses interconnect sources and destinations of data, systems for and methods of data alignment, data re-timing, and circular buffer underflow/overflow detection, are described.

27 Claims, 12 Drawing Sheets

HIGH SPEED BUS WITH ALIGNMENT, RE-TIMING AND BUFFER UNDERFLOW/OVERFLOW DETECTION ENHANCEMENTS

1. FIELD OF THE INVENTION

This invention relates to the field of networked systems in which high speed busses interconnect sources and destinations of data, and, more specifically, to alignment, re-timing, and buffer underflow/overflow enhancements for such systems.

2. RELATED ART

In current network environments in which high speed busses interconnect senders and receivers of data, the senders and receivers may be embodied in various forms, including end user devices, such as PCs, intermediate devices such as switches, routers, and gateways, or even asynchronous integrated circuit chips (ASICs) situated within any of the foregoing. Such devices often operate substantially autonomously with respect to one another. Therefore, in the case in which the senders transmit data to various receivers around the networks, situations can arise in which the receivers are overwhelmed by the volume of data transmitted by the senders. For example, a sender can transmit a block of data to a receiver which exceeds the amount of free storage which is available in one or more first-in-first-out (FIFO) buffers maintained by the receiver for the purpose of buffering data received over the network.

To manage or avoid these situations, various mechanisms for flow control have emerged. According to a first mechanism, illustrated in FIG. 1, a sender 102 transmits data 106 to a receiver 104. When the receiver 104 is unable to accommodate additional data, it transmits a transmission off (XOFF) signal 108 to the sender 102, advising it to stop transmitting data to the receiver 104. Responsive to the receipt of this signal, the sender 102 ceases transmitting data to the receiver 104. When the receiver is able to accommodate additional data, it communicates a transmission on (XON) signal, also identified with numeral 108, to the sender 102. Responsive to the receipt of this signal, the sender 102 restarts transmitting data to the receiver 104.

A problem with this mechanism is that it generates an excessive amount of overhead, embodied in the form of successive XON and XOFF signals, in the case in which the FIFO buffers used to buffer data at the receivers are relatively small. Therefore, other mechanisms for flow control have emerged.

One such mechanism is illustrated in FIG. 2. There, a sender 202 transmits a block of data 210 to the receiver 204. The sender 202 maintains a counter 206 which is representative of the amount of free space available in one or more FIFO buffers 208 maintained at the receiver 204. When a FIFO buffer is initially freed up at the receiver 204, the receiver sends an increment command 212 to the sender, over one or more signal lines. Responsive thereto, the sender 202 increments the counter 206 with the (known) size of the buffer. When the sender 202 sends a block of data to the receiver 204, it checks the contents of the counter 206 to determine if the one or more buffers 208 maintained at the receiver 204 can accommodate the block of data. If the block of data exceeds the contents of the counter 206, it is determined that the one or more buffers maintained at the receiver 204 cannot accommodate the block of data, and the sender 202 defers sending the data until additional buffer space is available. If the block of data is less than or equal to the contents of the counter 206, it is determined that the one or more buffers maintained at the receiver can accommodate the block of data. Hence, the sender 202 transmits the block of data to the receiver, and decrements the counter 206 by the size of the block of data.

This approach reduces the amount of overhead signals transmitted between the sender and receiver in the case in which small FIFO buffers are maintained at the receiver. It also avoids latency in the time required for the sender to determine the amount of free space at the receiver. A drawback is that the sender and receiver can easily get out of synchronization with respect to the perceived amount of free space at the receiver if, for example, an increment command sent to the sender is lost, or if a block of data transmitted to the receiver is lost. When this occurs, the error is catastrophic and cannot be recovered from.

Other problems occur when the data from the sender is source synchronous. Source synchronous data must often be synchronized to a clock which is used to synchronize events at the receiver. This is a difficult task to achieve, particularly when multiple source synchronous streams are concurrently being received at the receiver. Also, with source synchronous data, it is difficult to accurately detect buffer overflow/underflow conditions by comparing read and write pointers.

RELATED APPLICATION

This application is related to U.S. patent application Ser. No. 10/405,960, entitled "High Speed Bus With Flow Control and Extended Burst Enhancements," filed on even date herewith and owned in common by the assignee hereof, which is fully incorporated by reference herein as though set forth in full.

SUMMARY

In a first aspect of this disclosure, a system is described for aligning a plurality of source synchronous streams of data. In this system, a buffer corresponding to each of the streams of data is provided. In addition, a status indicator corresponding to each of the streams of data is provided. This status indicator indicates whether or not data for the corresponding stream has begun to be clocked into the corresponding buffer.

First logic in the system clocks data from a stream into the corresponding buffer using the source synchronous clock for the steam, and also sets the status indicator for the stream to indicate that data for the stream has begun to be clocked into the corresponding buffer.

Meanwhile, second logic in the system checks the status indicators. Upon or after determining that data for all of the streams has begun to be clocked into the corresponding buffers, the second logic clocks data out of each of the buffers using a local clock common to all the buffers. In one embodiment, the local clock is a master clock for the system.

In a second aspect of this disclosure, a system for re-timing a source synchronous stream of data is described. In this system, first logic clocks data from the stream into a buffer using the source synchronous clock for the stream, and second logic clocks data out of the buffer using a local clock. In one embodiment, the local clock is a master clock for providing overall synchronization of the system or a networked system of which the re-timing system is a part.

In a third aspect of this disclosure, a system is described for detecting either or both underflow and overflow conditions of a circular buffer capable of holding n entries, wherein n is an integer of two or more. In this system, each entry in the buffer includes a tag portion.

A first counter is provided which circularly counts through m values, wherein m is an integer which is less than n and not evenly divisible into n. First logic performs a read operation by (1) reading an entry from the buffer, (2) comparing the tag portion of the entry with the contents of the counter, and (3) either or both (a) signaling an underflow condition if the tag portion of the entry is less than the contents of the counter, and (b) signaling an overflow condition if the contents of the tag portion of the entry exceed the contents of the counter. If the contents of the counter equal the tag portion of the entry, the contents of the first counter are updated to reflect the read operation.

Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified-by the terms "about" or "substantially" or "near" in the range of 1% to 20% should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations in hardware, software, or combinations of hardware and software.

The term "counter" means (1) a device such as a register or storage location used to represent the number of occurrences of an event, or (2) an instrument for storing integers, permitting these integers to be increased or decreased sequentially by unity or by an arbitrary integer, and capable of being reset to zero or to an arbitrary integer, or (3) a device with a finite number of states each of which represents a number which, upon receipt of an appropriate signal, can be incremented or decremented by a given constant, and which may be capable of being set to a particular state such as zero, or (4) a register or storage location used to accumulate the number of occurrences of some event. Examples include a modulo-n counter, or a reversible counter.

The term "receiver" means any recipient of data in a bussed or networked system.

Figure 3:
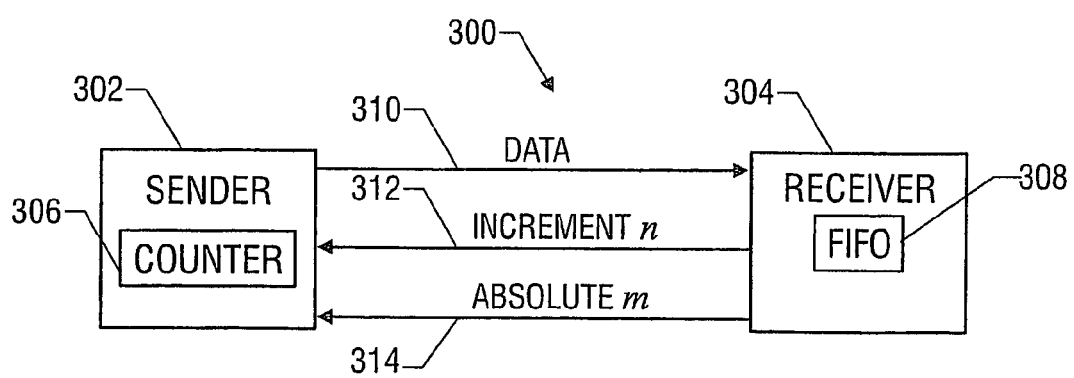
FIG. 3 is a block diagram illustrating a counter-based method of flow control in which the counter may be updated based on incremental or absolute free storage available at the receiver.

FIG. 3 illustrates a system 300 for performing flow control between a sender 302 and receiver 304 of data interconnected by one or more busses 310, 312, 314 in a networked system. In this system, a counter 306 is maintained at the sender 302, and the contents thereof, after initialization, are representative of free space available at the receiver 304 through one of more buffers 308.

The sender 302 is normally in a first default state. While in this state, the sender, when it is desired to transmit a block of data to the receiver 304, first compares the size of the block with the contents of the counter 306. If the size of the block exceeds the available free space at the receiver 304, the sender 302 defers or avoids transmitting the block. If the size of the block equals or is less than the available free space at the receiver 304, the sender 302 transmits the block over one or more signal lines 310, and the receiver 304, upon receiving the data, stores it in the one or more buffers 308. Upon or after transmission of a block to the receiver 304, first logic at the sender 302 decrements the counter 306 by the size of the block.

When free space in one or more buffers 308 becomes available, the receiver 304 sends a first command, INCREMENT n, to the sender advising it of the same. In FIG. 3, this command is transmitted over one or more signal lines 312. The argument n of the command is an integer representative of the incremental amount of free space which has become available at the receiver 304. In response to the sender's receipt of this command, second logic at the sender 302 increments the counter 306 by the argument n, i.e., the amount of incremental free space which has become available in the one or more buffers 308 maintained at the receiver 304.

Figure 1:
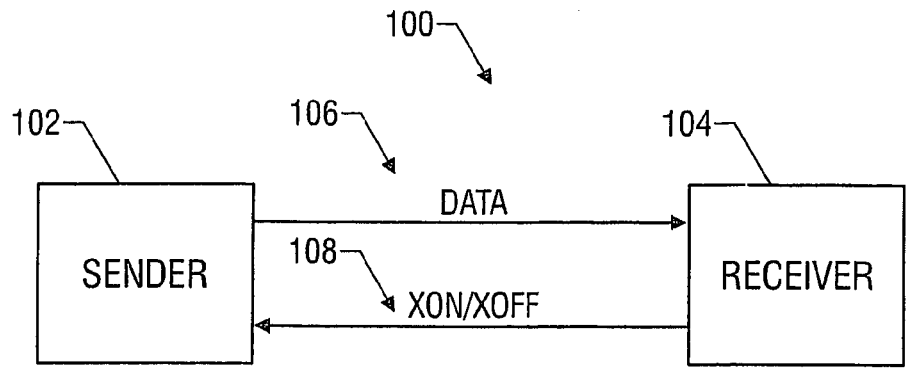
FIG. 1 is a block diagram illustrating a conventional transmit on/transmit off method of flow control.
Figure 2:
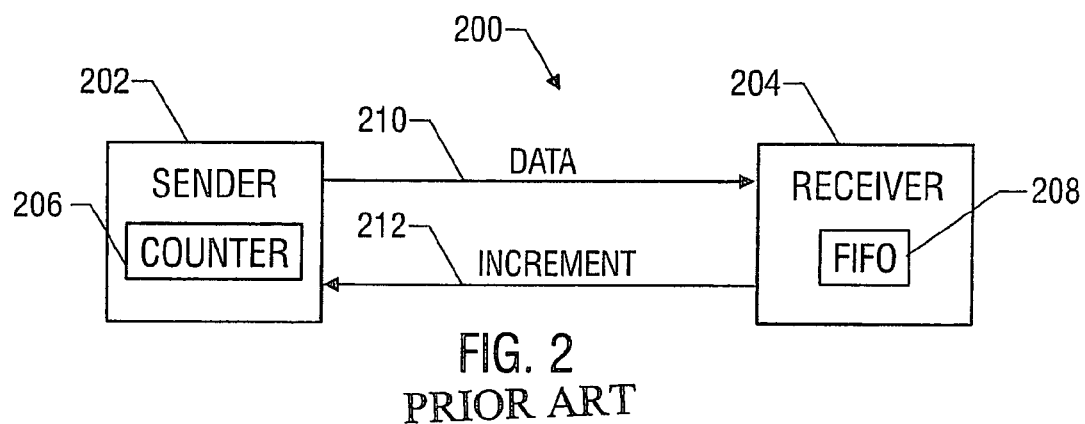
FIG. 2 is a block diagram illustrating a conventional counter-based method of flow control.

From time to time, the receiver 304 may also send a second command, ABSOLUTE m, to the sender, advising it of the amount of absolute free space which is available in one or more buffers maintained at the receiver 304. In FIG. 3, this command is sent over or more signal lines 314 (which may be the same as or different from signal lines 312). In response, third logic at the sender stores a value representative of this absolute free space in the counter 306. Through this third command, synchronization between the contents of the counter 306 and the absolute amount of free space at the receiver 304 can be easily maintained. Moreover, unlike the conventional flow control system illustrated in FIG. 2, in the system illustrated in FIG. 3, error recovery is now possible if it is ever determined that the contents of the counter 306 are not representative of the amount of free space actually available at the receiver 304.

In one implementation, upon reset or initialization, the sender 302 enters a third reset state, and the contents of the counter 306 are initialized to zero. An ABSOLUTE m command, upon receipt thereof by the sender 302, transitions the sender 302 to the first state, and also initializes the counter 306 with the amount of absolute free space available at the receiver 304.

In one implementation example, a lock out counter is maintained at the sender 302 to avoid race conditions where data is transmitted from the sender 302, and an ABSOLUTE m command is sent from the receiver 304 prior to its receipt of the data due to the latency of the bus. Since the ABSOLUTE m command is sent prior to receipt of the data at the receiver 304, it overstates the absolute free space available at the receiver 304.

Upon being reset, the lockout counter is configured to automatically count up to a predetermined number of clock pulses, e.g., 255, and then stop. The counter is reset when the sender 302 transmits data to the receiver 304. Any ABSOLUTE m command received while the counter is counting up to its final state is ignored. When the counter reaches its final state, it stops counting. Any ABSOLUTE m command received while the counter is in this state is executed. Other approaches for implementing this lock-out feature are possible so nothing in the foregoing should be taken as limiting.

In one embodiment, the system 300 further comprises fifth logic in the sender 302 for transitioning the sender 302 to a second state upon or after receipt of a third command from the receiver. In one example, this third command may be referred to as the BLACK HOLE command. This second state is characterized by the sender 302 transmitting data to the receiver 304 without regard to the contents of the counter 306.

In a second embodiment, the system 300 further comprises sixth logic in the sender 302 for transitioning the sender 302 from the second state to the first state upon or after receipt of the second command, i.e., the ABSOLUTE m command, from the receiver 304.

In one example, the sender 302 and receiver 304 are ASICs, and the one or more buffers 308 are first-in-first-out (FIFO) buffers. In one implementation, the system 300 is embodied in the sender 302.

Figure 4:
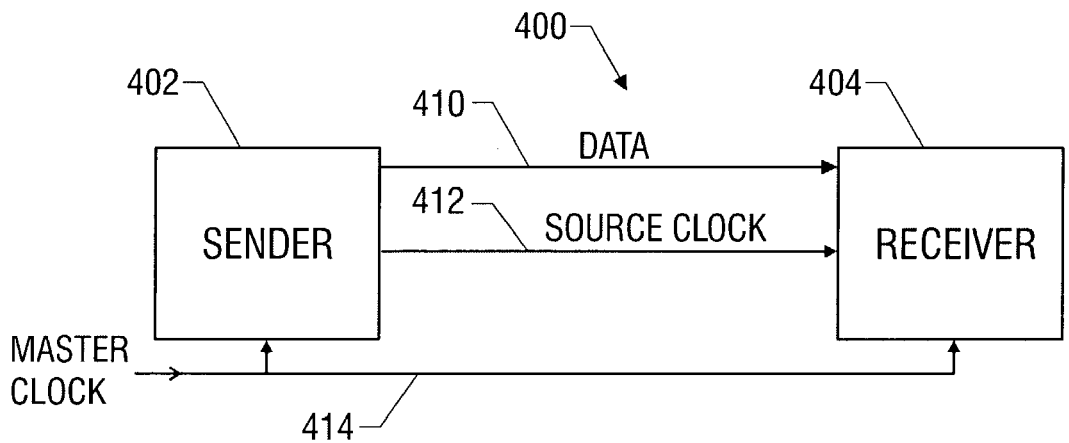
FIG. 4 is a block diagram illustrating both source synchronous and master clock domains.

FIG. 4 illustrates a networked system 400 in which source synchronous data is transmitted from a sender 402 to a receiver 404. The source synchronous data comprises a data portion, which is transmitted over one or more signal lines 410, and a clock portion, which is transmitted over one or more signal lines 412. At the receiver 404, the data portion is sampled using the clock portion. Since the data and clock portions are equally affected by latency in the system, there is little risk of misalignment between the data and clock portions. In one implementation, the clock portion comprises a double data rate (DDR) clock in which the data portion is sampled on both the rising and falling edges of the clock.

Figure 5:
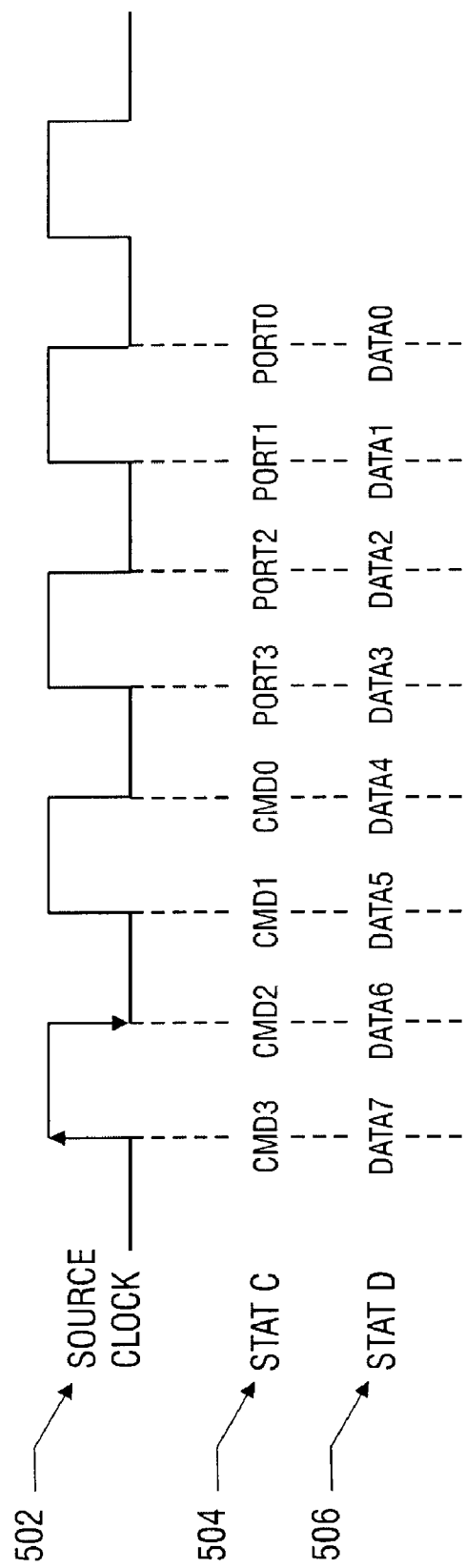
FIG. 5 is a timing diagram illustrating the clocking of commands over a plurality of signal lines synchronized to a double data recovery (DDR) source synchronous clock.

Turning back to FIG. 3, the commands INCREMENT n, ABSOLUTE m, or BLACK HOLE, as previously discussed, may be transmitted from receiver 304 to sender 302 in the form of source synchronous signals. In one example, each of these commands may be communicated to the sender 302 over three signal lines. In FIG. 5, the first signal line, identified with numeral 502, carries the source clock. In the particular example illustrated, the source clock is a DDR clock, which means that data is carried on the other two signals at both positive-going and negative-going transitions of the clock. The second signal line, identified with numeral 504, carries four bits, CMD3, CMD2, CMD1, and CMD0, specifying the command type, and four bits, PORT3, PORT2, PORT1, and PORT0, specifying one of sixteen ports at the receiver that the command relates to. It is assumed in this example that the senders and receivers each have 16 ports, and a communication between the two can take place using any of the 16 ports. It is also assumed in this example that a value of 0×8 for the four command bits, CMD[3:0] specifies the INCREMENT command, a value of 0xC (hex) for these bits specifies an ABSOLUTE command, and a value of 0xE (hex) for these bits specifies a BLACK HOLE command. The third signal line, identified with numeral 506, carries eight bits, DATA7, DATA6, DATA5, DATA4, DATA3, DATA2, DATA1, and DATA0. These eight bits specify the argument, i.e., n or m, of the command. With these 8 bits, an INCREMENT or ABSOLUTE command specifying up to 256 bytes of incremental or absolute free space may be communicated to the sender.

Figure 6:
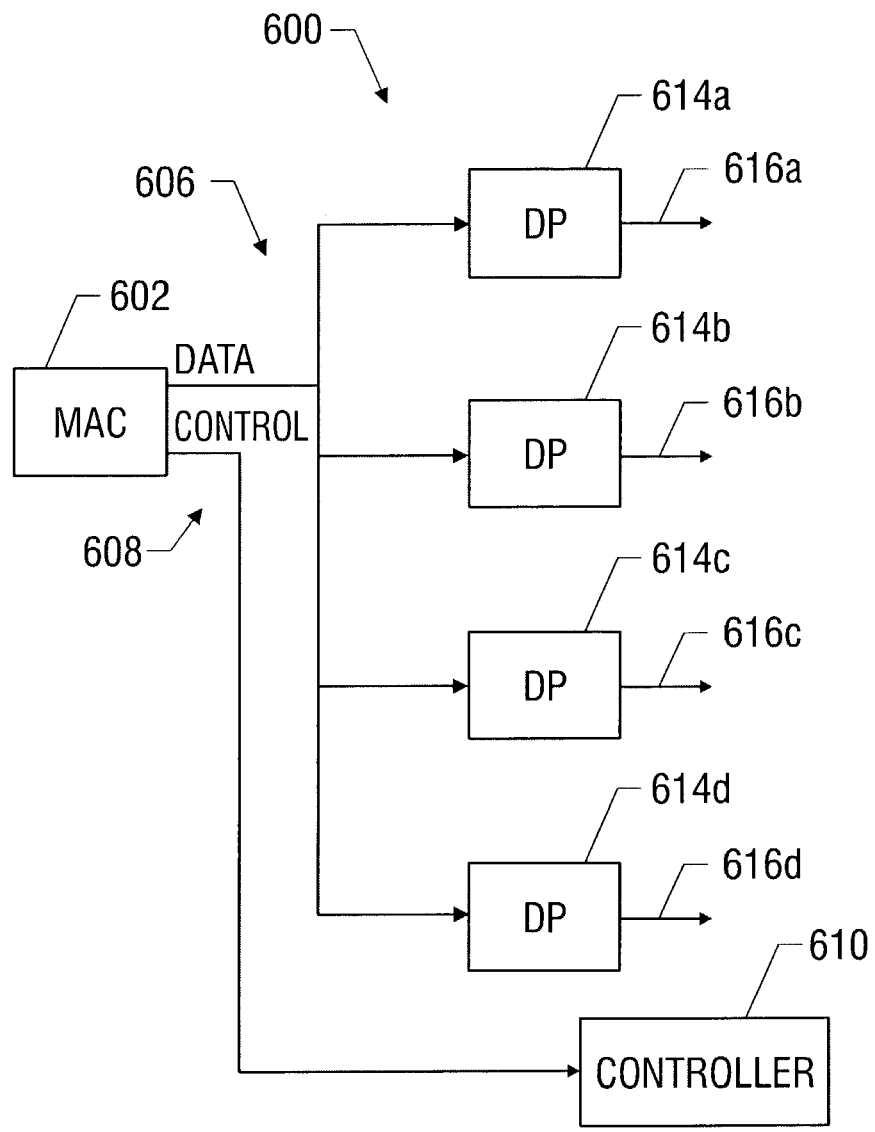
FIG. 6 is a block diagram illustrating the generation of multiple source synchronous data streams at a sender.

FIG. 6 illustrates a particular configuration of a sender in which a single stream of data 606 emanating from a media access controller (MAC) 602 is split up (for pin conservation purposes) into a plurality of separate source synchronous streams 616a, 616b, 616c and 616d. The process of splitting up the stream 606 into separate streams, and associating each of the streams with its own separate clock, is performed by corresponding data path elements 614a, 614b, 614c and 614d under the control of controller 610, which in turn is directed by the MAC 602 through control line 608. These separate source synchronous streams are then transmitted to a receiver.

The situation is depicted in FIG. 4, which shows a source synchronous stream 410, 412 transmitted from the sender 402 to the receiver 404. (For ease of illustration only, one source synchronous stream is illustrated in FIG. 4, it being understood that for purposes of this discussion multiple such streams may be present). A master clock 414 is common to both the sender 402 and receiver 404. When the multiple streams are received at the receiver 404, there is a need to combine and align the data so it is synchronous with the master clock.

Figure 7B:
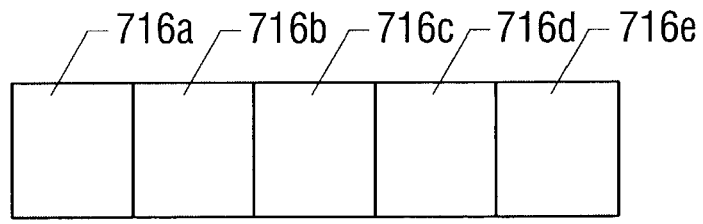
FIG. 7B illustrates an example of a multi-stream status indicator for use in the system of FIG. 7A.
Figure 7A:
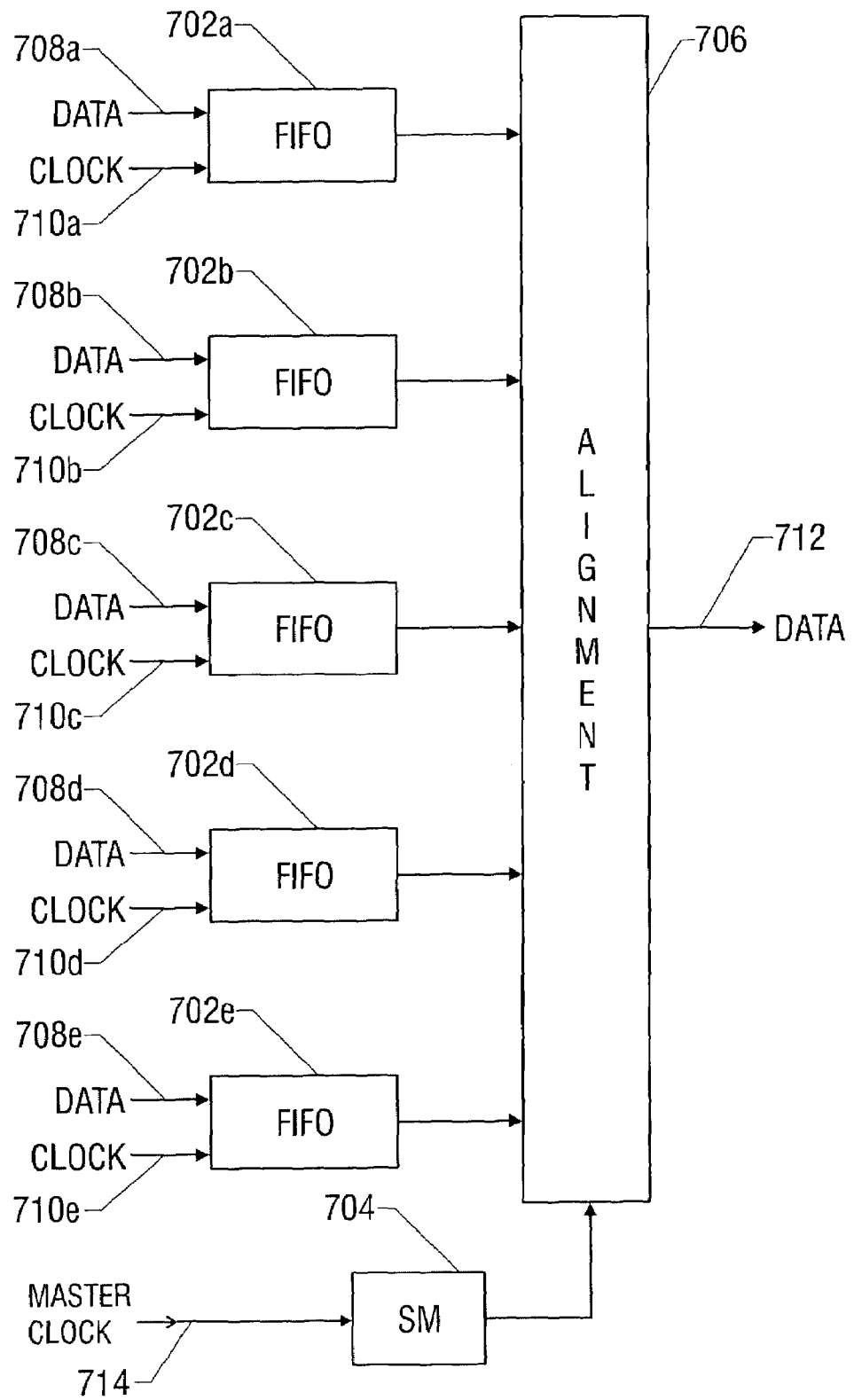
FIG. 7A is a block diagram illustrating a multi-buffer arrangement for aligning multiple source synchronous data streams, and synchronizing the read out of the same to a master clock common to all the streams.

FIG. 7A illustrates a system for performing this function which may be embodied at the receiver. The data portions of the incoming streams are identified with numerals 708a, 708b, 708c, 708d, and 708e, and the clock portions of the incoming streams are identified with numerals 710a, 710b, 710c, 710d, and 710e. A buffer 702a, 702b, 702c, 702d, and 702e for each of the incoming streams is provided. In addition, a status indicator (not shown in FIG. 7A) corresponding to each of the streams of data is provided. This status indicator indicates whether or not data for the corresponding stream has begun to be clocked into the corresponding buffer. An example of such a status indicator, implemented as a multi-bit storage location, with a bit allocated for each of the streams, is illustrated in FIG. 7B. The individual bits in the example illustrated are identified with numerals 716a, 716b, 716c, 716d, and 716e. The default state of each these bits may be '0', and when data for a stream has begun to be clocked into a buffer, the corresponding bit is set to a '1'.

First logic in the system clocks data from a stream into the corresponding buffer using the source synchronous clock for the steam, and also sets the status indicator for the stream to indicate that data for the stream has begun to be clocked into the corresponding buffer.

Meanwhile, second logic in the system, embodied as state machine (SM) 704 and alignment logic 706 in the particular implementation illustrated in FIG. 7B, checks the status indicators. Upon or after determining that data for all of the streams has begun to be clocked into the corresponding buffers, the second logic clocks this data out of each of the buffers using a master clock 714 common to all the buffers to form a combined stream 712 which is synchronized to the master clock 714.

In one embodiment of this system, the buffers 702a, 702b, 702c, 702d, and 702e are FIFO buffers, and the source synchronous clocks 710a, 710b, 710c, 710d and 710e for each of the streams are double data rate (DDR) source synchronous clocks.

In one implementation, each of the FIFO buffers 702a, 702b, 702c, 702d, and 702e has a write pointer. Moreover, a single read pointer is provided which is common to all the buffers. In this implementation, the first logic is configured to update the write pointer for a buffer as data for a stream is clocked into the buffer using the source synchronous clock for the stream, and the second logic is configured to update the read pointer common to all the buffers as data is clocked out of the buffers using the master clock. In one example, the first logic updates the write pointer for a buffer during a write operation by incrementing it, and the second logic updates the read pointer during a read operation as data is clocked out of the buffers by incrementing it. Alternatively, the first logic may update the write pointer for a buffer during a write operation by decrementing it, and the second logic may update the read pointer during a read operation by decrementing it.

Figure 8:
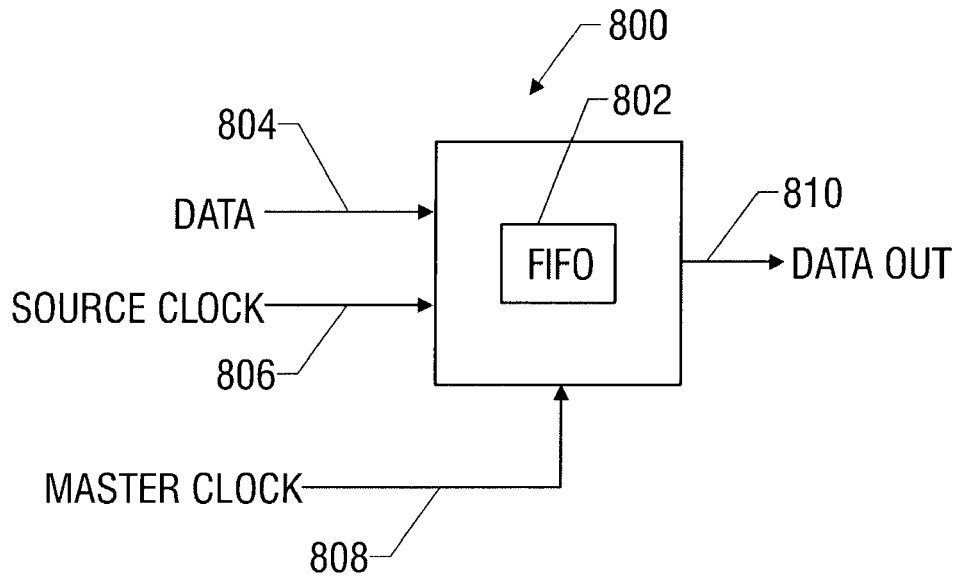
FIG. 8 is a block diagram of a system for re-timing a source synchronous data stream from the source synchronous domain to the master clock domain.

Turning back to FIG. 4, as stated, a master clock 404 is common to both the sender 402 and receiver 404. When even a single stream of source synchronous data is received at the receiver 404, there is often a need to re-time the data so it is synchronous with the master clock (or other local clock) rather than the source synchronous clock. Accordingly, the system 800 illustrated in FIG. 8, which may be embodied in the receiver 404, is provided for performing this function.

In this system, first logic clocks the data portion 804 of the stream into buffer 802 using the clock portion 806 of the source synchronous stream. After a time, second logic clocks the data out of the buffer 802 using the master clock 808 (or other local clock). The data as it is clocked out of the buffer is identified in FIG. 8 with numeral 810.

In one embodiment, the clock portion of the stream is a DDR source synchronous clock, and the buffer 802 is a FIFO buffer. In one implementation, the FIFO buffer has a read pointer and a write pointer, and the first logic is configured to update the write pointer during a write operation using the source synchronous clock 806 for the stream, and the second logic is configured to update the read pointer during a read operation using the master clock 808. In one example, the write pointer is updated during a write operation by incrementing it, and the read pointer is updated during a read operation by incrementing it. Alternatively, the write and read pointers may both be decremented during their respective operations.

Turning back to FIG. 4, it is often convenient to transfer data from the sender 402 to the receiver 404 in the form of bursts of predetermined size. In one example, in which commands, such as the INCREMENT n, ABSOLUTE m, or BLACKHOLE, may also be transmitted from the sender 402 to the receiver 404 in the form of four clock cycle/eight clock transition bursts as illustrated in FIG. 5, it is convenient to set the possible predetermined sizes of the data bursts to integer or fractional multiples of the burst size needed to transmit the commands. In one example, the possible predetermined sizes of the data bursts are 32, 48, 64, and 80 bytes. In this particular example, the initiation of a command burst can be determined by examining the STAT C signal line 504 illustrated in FIG. 5. A 0 to 1 transition on that signal line, consistent with 0x8, 0xC (hex), or 0xE (hex) values for CMD[3:0], indicates the initiation of a command burst.

When the data is transmitted in the form of bursts, however, the issue of fractional bursts, a burst less than one or more of the possible, normally-used burst sizes, must be dealt with. This problem is particularly acute in the case in which the possible burst sizes are expressed in the form of a plurality of discrete, predetermined burst sizes. In many cases, the size of the fractional burst may not be sufficient to justify the overhead needed to transfer the burst.

Figure 9:
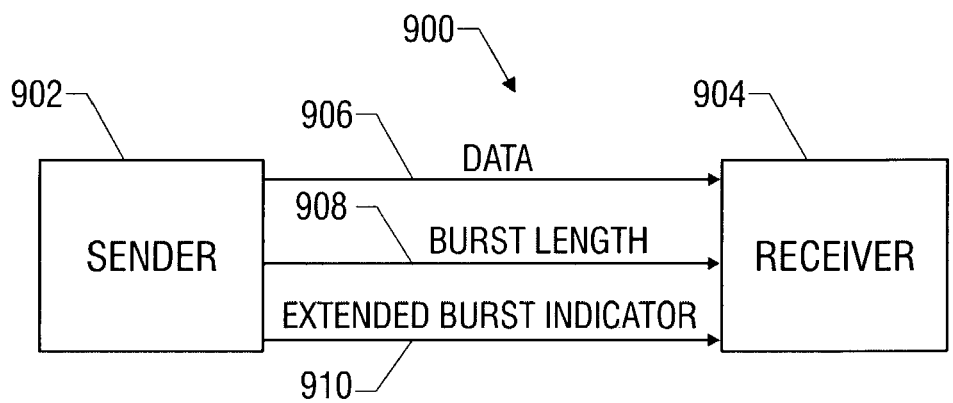
FIG. 9 is a block diagram illustrating extended burst transfers.

A system 900 which addresses this problem is illustrated in FIG. 9. In this system, data is transmitted over bus 906 in the form of bursts. The system 900 selectively varies the number of bursts used to transfer a block of data in order to overcome the problem of excessive overhead associated with small sized fractional bursts.

In this system, first logic transmits a block of data as n bursts (wherein n is an integer of two or more) provided the size of any fractional burst in the n bursts exceeds a threshold level.

However, second logic transmits the block as less than n bursts if the size of any fractional burst is less than or equal to the threshold level.

In one embodiment, a block of data which would otherwise be represented as n bursts of one or more predetermined sizes, where the nth burst is a fractional burst having a size less than or equal to the threshold level, is in fact transmitted as n−1 bursts, where the first n−2 bursts are of a first predetermined size, and one of the bursts, normally but not necessarily the last, (n−1)st burst, is of a second predetermined extended size, equal to the sum of the first predetermined size and an amount sufficient to accommodate the size of the fractional burst. Since the block is transmitted as n−1 bursts, the overhead associated with the nth burst is avoided.

In one implementation, as illustrated in FIG. 9, the sender 902 indicates to the receiver 904 through a signal line 910 that an extended burst is being is being transmitted, and also indicates to the receiver 904 the size of the current burst being sent over one or more signal lines 908. Upon receipt of this information, the receiver 904 is able to take appropriate action to buffer or otherwise handle the burst.

In one example, the first predetermined burst size is 64 bytes, the second predetermined extended burst size is 80 bytes, and the threshold level is 16 bytes. If a fractional burst is less than or equal to 16 bytes in size, the block is transmitted as n−1 bursts, with n−2 bursts being of the first predetermined size of 64 bytes, and the (n−1)th burst having the second predetermined extended size of 80 bytes. If, on the other hand, the fractional burst is greater than 16 bytes in size, the block is transmitted as n bursts, with n−1 bursts being of the first predetermined size of 64 bytes in size, and the nth burst having a predetermined size equal to 32, 48 or 64 bytes, whichever is needed to accommodate the size of the fractional burst as a standalone entity. In this example, the sender 902 communicates to the receiver 904 the size of a burst using a 6 bit value, which is capable of indicating absolute sizes of up to 64 bytes. When the extended burst indicator is asserted, the 6 bit value which is transmitted is the absolute size of the burst minus 64. Through this approach, the 6 bits can be used to communicate burst sizes of up to 80 bytes. Thus, for a burst size of 80 bytes, the sender 902 in this example communicates a value of 16 to the receiver 904 using these 6 bits.

Turning back to FIG. 8, the traditional method of detecting underflow or overflow for the buffer 802 is based on a comparison of read and write pointers. However, in the system 800 of FIG. 800, since the write pointer for the buffer 802 is typically updated through the source synchronous clock 806, and the read pointer for this buffer is typically updated through a different clock, the master clock 808, the traditional method will not always be accurate in detecting underflow or overflow conditions. Instead, race conditions can cause the traditional method to detect underflow or overflow conditions when none exist, or fail to detect underflow or overflow conditions when such are in fact present.

To avoid this problem, a counter-based system for detecting either or both underflow and overflow conditions of a circular buffer such as a FIFO buffer is provided. In this system, which is illustrated through the examples of FIGS. 10A and 10B, the buffer 1000 is assumed to be capable of holding n entries, wherein n is an integer of two or more. Moreover, each entry in the buffer includes a tag portion 1002.

A first counter 1008 is provided which is capable of circularly counting through m values, wherein m is an integer which is less than n and not evenly divisible into n.

First logic performs a read operation from the buffer 1000 by (1) reading an entry from the buffer, (2) comparing the tag portion 1002 of the entry with the contents of the counter 1008, and (3) either or both (a) signaling an underflow condition if the tag portion 1002 of the entry is less than the contents of the counter 1008, and (b) signaling an overflow condition if the tag portion 1002 of the entry exceeds the contents of the counter 1008. If the contents of the counter 1008 equal the tag portion 1002 of the entry, the contents of the first counter 1008 are updated.

In one embodiment, the system further comprises a second counter 1010 for circularly counting through m values. In this second embodiment, second logic performs a write operation by (1) forming an entry to be written to the buffer, the tag portion 1002 of the entry representative of the contents of the second counter 1010, (2) writing the entry to the buffer, and (3) updating the contents of the second counter.

In one implementation, the first logic is configured to update the contents of the first counter 1008 during a read operation by incrementing it, and the second logic is configured to update the contents of the second counter 1010 during a write operation by incrementing it.

In an alternate implementation, the first logic is configured to update the contents of the first counter 1008 during a read operation by decrementing it, and the second logic is configured to update the contents of the second counter 1010 during a write operation by decrementing it.

Figure 10A:
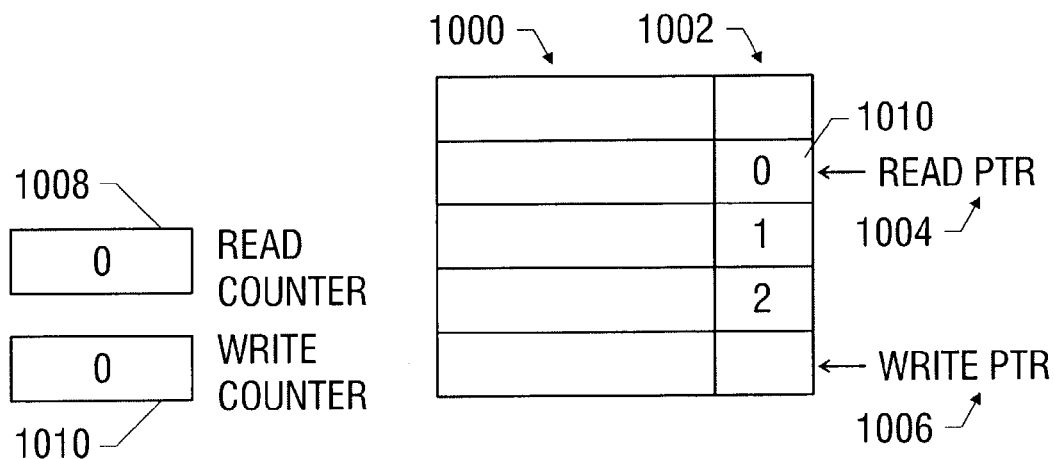
FIG. 10A is a block diagram illustrating an example of a write operation to a circular buffer which does not result in an overflow condition.

To further explain the operation of this system, consider the example illustrated in FIG. 10A. In this example, circular buffer 1000 is assumed to be a FIFO buffer with five possible entries, and read counter 1008 and write counter 1010 are configured to circularly count between 0 and 2 in increments of 1. In other words, the pattern of values achieved by the counters follow a repeating pattern as follows: 0, 1, 2, 0, 1, 2, 0, 1, 2, etc. Three entries are assumed to have been written into the buffer 1000, bearing respectively tag values of 0, 1, and 2. The write pointer 1006 points to the next available entry in the buffer 1000 for writing to, and the read pointer 1010 points to the next entry in the buffer 1000 to be read from.

When a read operation is performed, the tag value of the entry pointed to by the read pointer is compared with the contents of the read counter 1008. Since the two agree, an overflow condition is not detected. Instead, the value is read, and the read pointer and read counter are both incremented.

When a write operation is performed, the contents of the write counter 1010 becomes the tag value for the entry written into the buffer 1000 at the location pointed to by the write pointer 1006. Then, both the write pointer and write counter are both incremented.

Figure 10B:
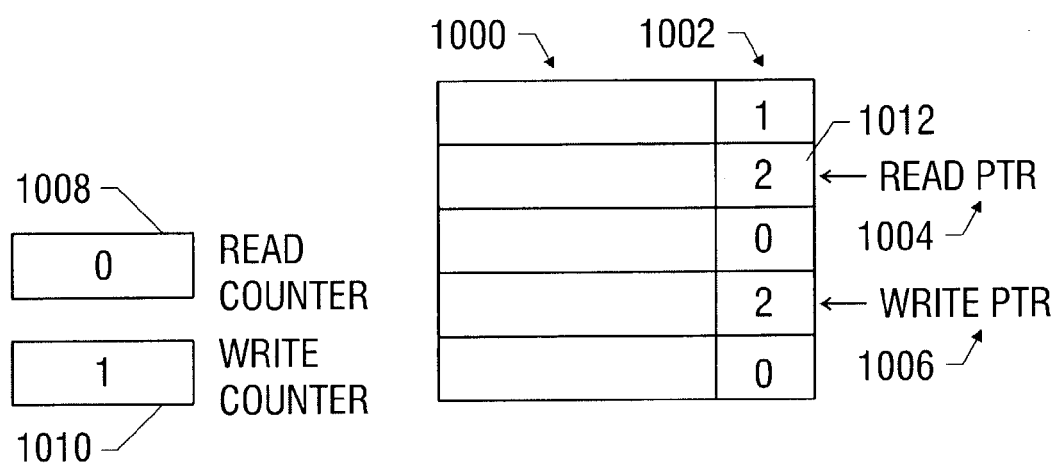
FIG. 10B is a block diagram illustrating an example of a write operation to a circular buffer which results in an overflow condition.

Now, consider the example illustrated in FIG. 10B. This example represents that illustrated in FIG. 10A after four additional successive write operations to the buffer 1000. At the conclusion of these write operations, the tag portions of the buffer entries, the contents of the read and write counters 1008, 1010, and the locations pointer to by the read and write pointers 1002, 1004 are as illustrated in FIG. 10B.

When the next read operation is performed, the tag value for the location pointed to by the read pointer 1002, 2, is compared with the contents, 0, of the read counter 1008, an overflow condition is detected since the tag value for the entry exceeds the contents of the read pointer 1002. That is an accurate assessment of the situation since, as can be seen from FIG. 10B, two valid entries in the buffer have been overwritten: that pointed to by the read pointer, and the next successive location.

Figure 10C:
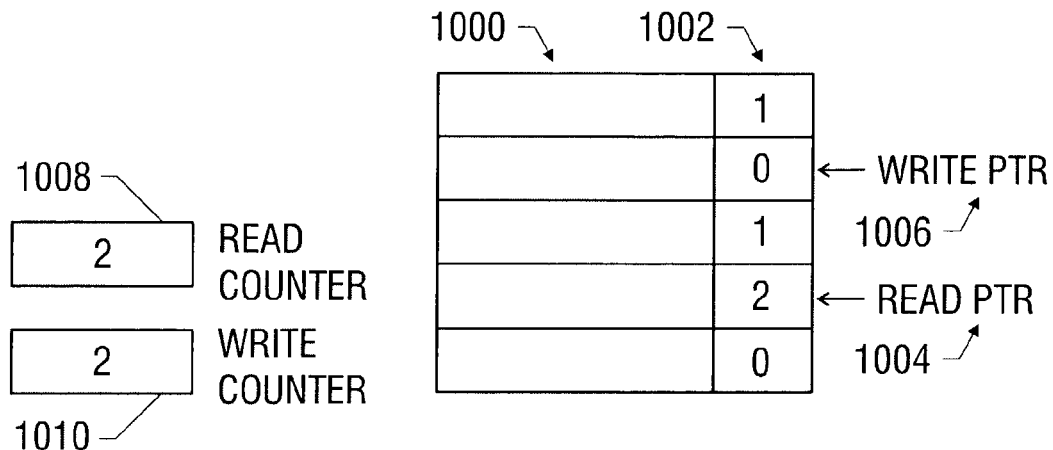
FIG. 10C is a block diagram illustrating the state of the circular buffer just prior to the read operation of FIG. 10D.
Figure 10D:
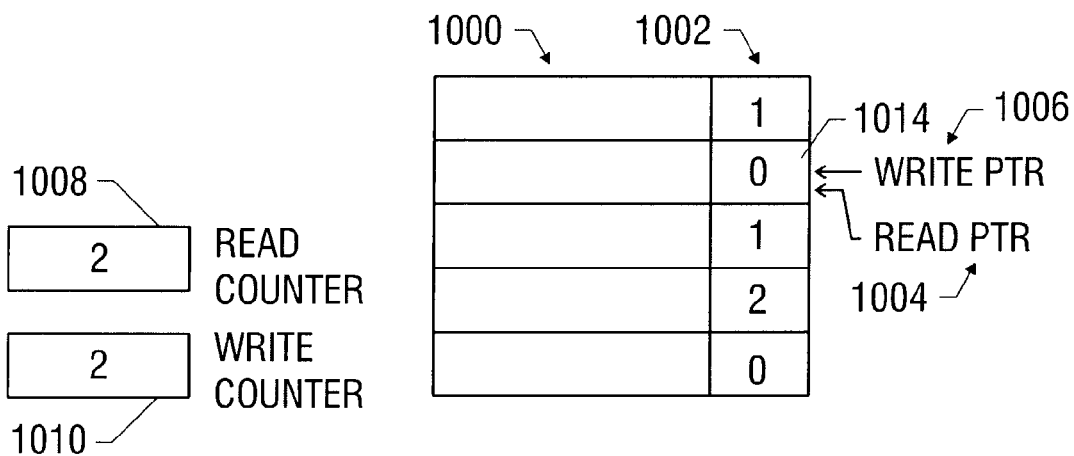
FIG. 10D is a block diagram illustrated an example of a read operation which results in an underflow condition.

FIG. 10C illustrates the state of buffer 1000 of FIG. 10A after two more write operations, followed by two additional read operations. FIG. 10D illustrates the buffer of FIG. 10C after three more read operations. During the third of these operations, the tag portion of the entry 1014, 0, is compared with the contents of the read counter 1008, 2. Since the tag portion of the entry 1014 is less than the contents of the read counter 1008, an underflow condition is detected. That is an accurate assessment of the situation since, as illustrated in FIG. 10D, the entry 1014 has been re-read even though this value has already been read and a new data value has not yet been written into this entry.

Figure 11:
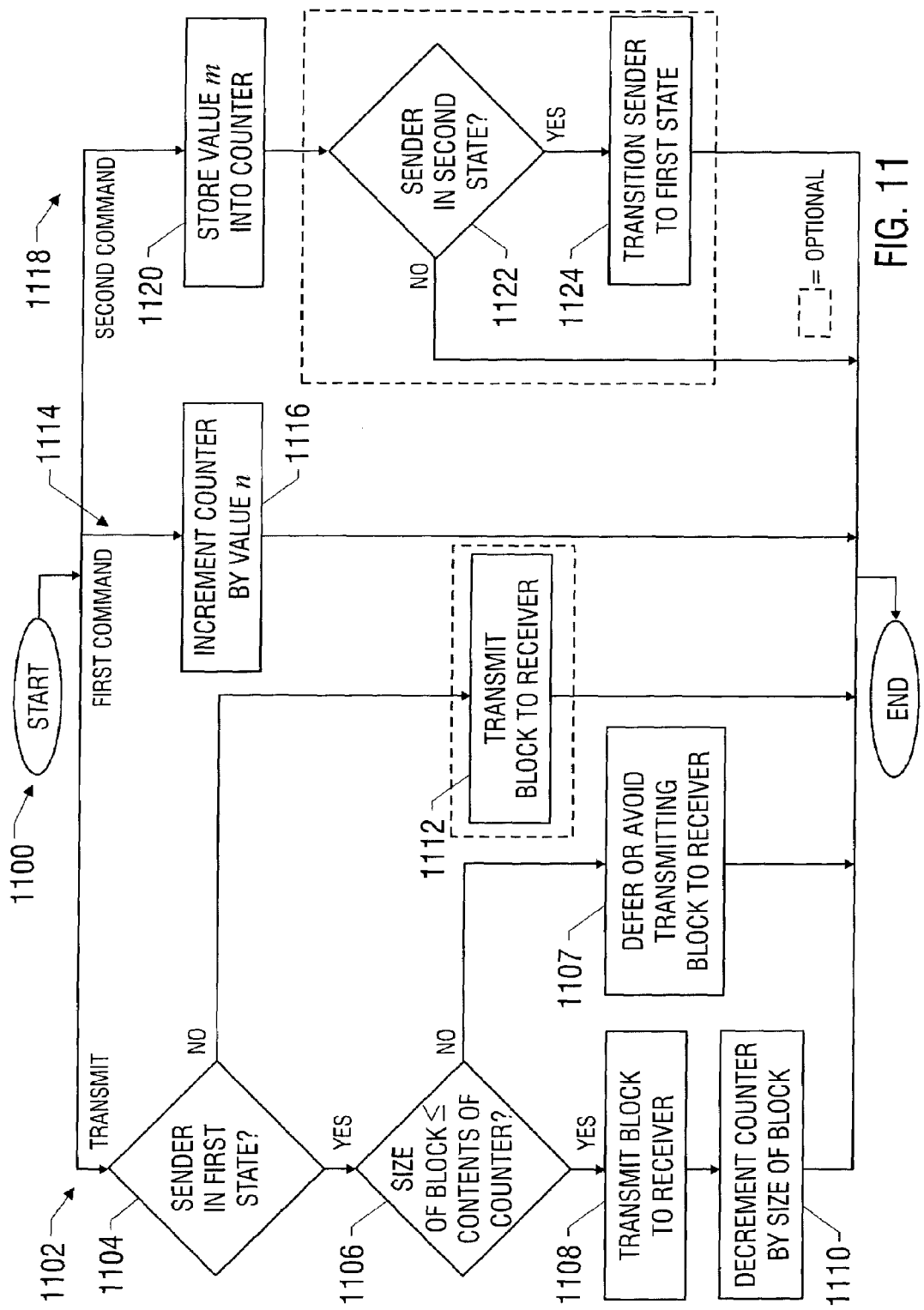
FIG. 11 is a flowchart of a method of performing flow control between a sender and receiver in a networked system.

FIG. 11 is a flowchart of one embodiment of a method 1100 of performing flow control between a sender and receiver of data in a networked system. In this method, the sender is configured to maintain a counter whose contents, after initialization, are representative of available free space in one or more buffers maintained by the receiver. As illustrated, in one embodiment, upon the inception of the method, program control or method flow may pass down one of three branches, identified respectively with numerals 1102, 1114, and 1118. Each one of these three branches will be explained in turn.

Branch 1102 is followed if it is desired to transmit a block of data from the sender to the receiver. Inquiry step 1104 is performed, to inquire whether the sender is in a first (default) state indicating that the contents of the counter should first be checked before performing the transfer. If so, inquiry step 1106 is performed. In inquiry step 1106, it is determined whether or not the size of the block to be transmitted is less than or equal to the contents of the counter. If so, step 1108 is performed. In step 1108, the block of data is transmitted to the receiver. Then, step 1110 is performed. In step 1110, the contents of the counter are decremented by the size of the block. Program control or method flow is then exited or terminated.

If, in inquiry step 1106, it is determined that the size of the block to be transmitted exceeds the contents of the counter, step 1107 is performed. In step 1107, transmission of the block is either deferred or avoided. Program control or method flow is then exited or terminated.

Turning back to inquiry step 1104, if it is determined that the sender is not in the first state, program control or method flow is exited or terminated. Alternatively, in one embodiment, it is assumed that the sender is in a second state, characterized by the fact that data is transmitted by the sender to the receiver without regard to the contents of the counter. (Instead of assuming that the sender is in the second state, an inquiry step could be performed here to ensure that the sender is in the second state. If not, an error condition could be flagged.). Step 1112 is then performed. In step 1112, the block of data is transmitted to the receiver, while avoiding the inquiry step 1106. Program control or method flow is then exited or terminated.

Branch 1114 is followed if a first command is received advising the sender of the amount of incremental free space which has become available at the receiver. In one embodiment, as discussed, this first command is of the form INCREMENT n, where n indicates the incremental free space which has become available at the receiver. In step 1116, upon or after receipt of such a command at the sender, the counter is incremented by n, the incremental free space which has become available at the receiver. Program control or method flow is then exited or terminated.

Branch 1118 is followed if a second command is received advising the sender of the absolute amount of free space which is available at the receiver. In one embodiment, as discussed, this command is of the form ABSOLUTE m, where m is the absolute amount of free space available at the sender. Upon or after receipt of such a command at the sender, step 1120 is performed. In step 1120, the value m, the absolute amount of free space available at the sender, is stored in the counter.

In one embodiment of branch 1118, a check is made whether the sender is in the third reset state. If so, in addition to storing the value m in the counter in step 1120, the sender is transitioned into the first state.

In one implementation of branch 1118, a check is also made whether the lock-out timer (previously discussed) is still counting up to its final state. If so, the ABSOLUTE m command is ignored. If not, the ABSOLUTE m command is implemented.

Program control or method flow is then exited or terminated. Alternatively, in one embodiment, inquiry step 1122 is performed. In inquiry step 1122, it is determined whether or not the sender is in the second state which, as discussed earlier, is characterized by the fact that transmission occurs without regard to the contents of the counter. If the sender is in the second state, step 1124 is performed. In step 1124, the sender is transitioned from the second state to the first state which, as discussed previously, is characterized by the fact that the contents of the counter are compared with the size of a block before that block is transmitted to the receiver. Program control or method flow then exits or terminates.

In inquiry step 1122, if it is determined that the sender is not in the second state, it is assumed that the sender is already in the first state, and program control or method flow exits or terminates. Alternatively, an inquiry step could be performed here to explicitly determine whether or not the sender is in the first state. If not, an error condition could be flagged.

In one embodiment, another branch is followed upon or after receipt of a third command directing the sender to transmit data without regard to the contents of the counter. As discussed previously, this command may take the form of BLACK HOLE. In this embodiment, upon or after receipt of such a command, the sender is transitioned to the second state.

Figure 12A:
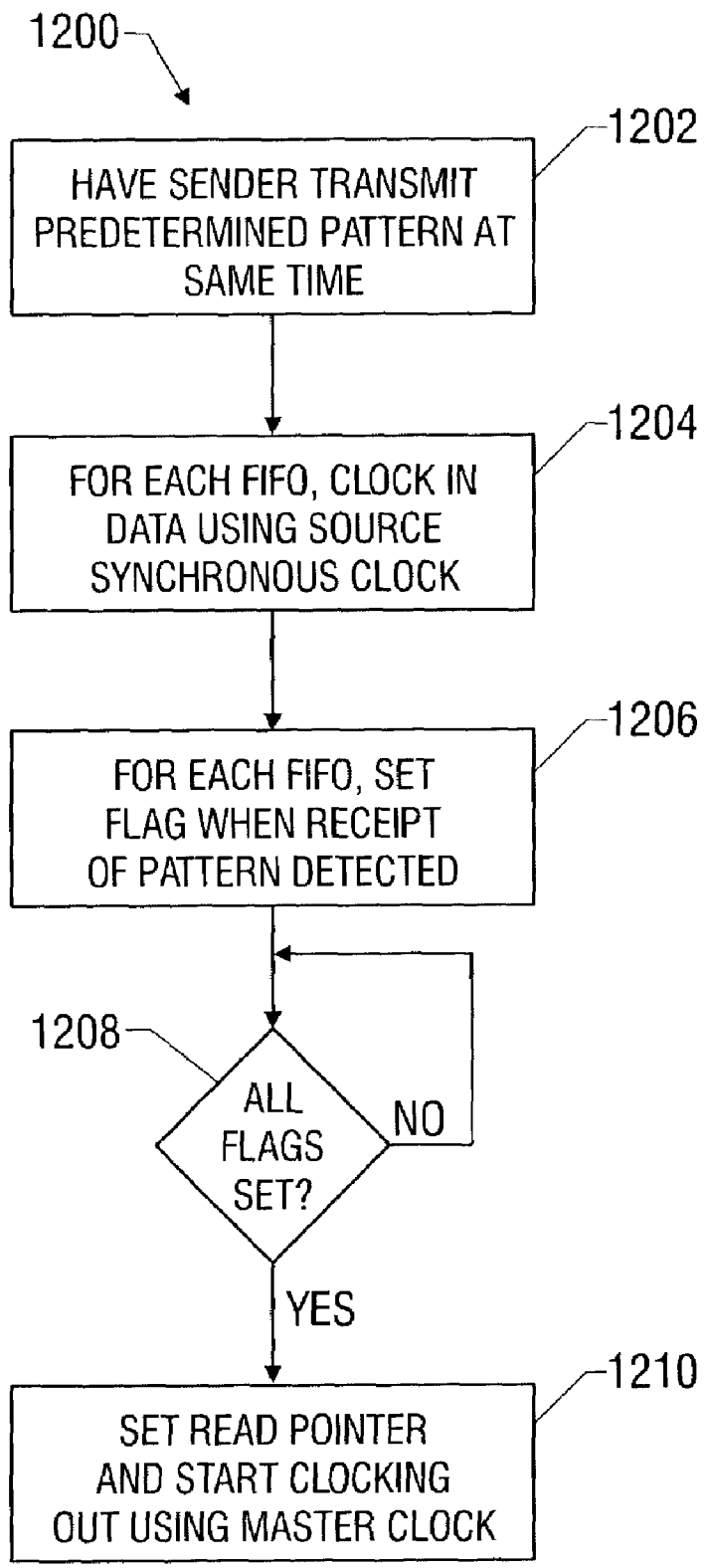
FIG. 12A is a flowchart of a method of aligning multiple source synchronous data streams.

FIG. 12 is a flowchart of a method 1200 of aligning a plurality of source synchronous streams of data. In one embodiment, the method begins with step 1202, which comprises having the sender enter an alignment mode, and transmit a predetermined pattern of data through the multiple streams at the same time. In the configuration illustrated in FIG. 6, this step is performed by controller 610 arranging to have each of the DPs 614a, 614b, 614c, 614d, and 614d transmit the predetermined pattern, in source synchronous format, at the same time.

Turning back to FIG. 12, step 1204 is then performed. In step 1204, the data from each of the streams is clocked into a corresponding buffer using the source synchronous clock for the stream. Step 1206 is then performed. In step 1206, a status indicator for the stream is set to indicate that data for the stream has begun to be clocked into the corresponding buffer.

Inquiry step 1208 is also performed. Although this step is shown in FIG. 12 as being performed after steps 1202-1206, it may be performed concurrently with these steps. In inquiry step 1208, the status indicators are checked. If it is determined that the status indicators for all the buffers indicate that data for all of the streams has begun to be clocked into the corresponding buffers, step 1210 is performed. In step 1210, data from each of the buffers is clocked out using a master clock common to all the buffers. At this point, since alignment has been achieved, in one embodiment, the sender exits the alignment mode of operation, and enters a normal mode of operation.

In one implementation of this method, the source synchronous clocks are double data rate (DDR) source synchronous clocks, and the buffers are each FIFO buffers.

In one implementation example, each of the buffers are FIFO buffers having a separate write pointer, and there is also a read pointer is common to all the buffers. In this implementation example, the write pointer for a buffer is updated as data for the stream is clocked into the buffer using the source synchronous clock for the stream, and the read pointer common to all the buffers is updated as data is clocked out of the buffers using the master clock.

The step of updating the write pointer for a buffer may comprise incrementing the pointer for each entry written into the buffer, and the step of updating the read pointer may comprise decrementing the pointer for each group of entries read out in common from the buffers. Alternatively, the step of updating the write pointer may comprise decrementing it for each entry written into the buffer, and the step of updating the read pointer may comprise incrementing it for each group of entries read out in common from the buffers.

Figure 12B:
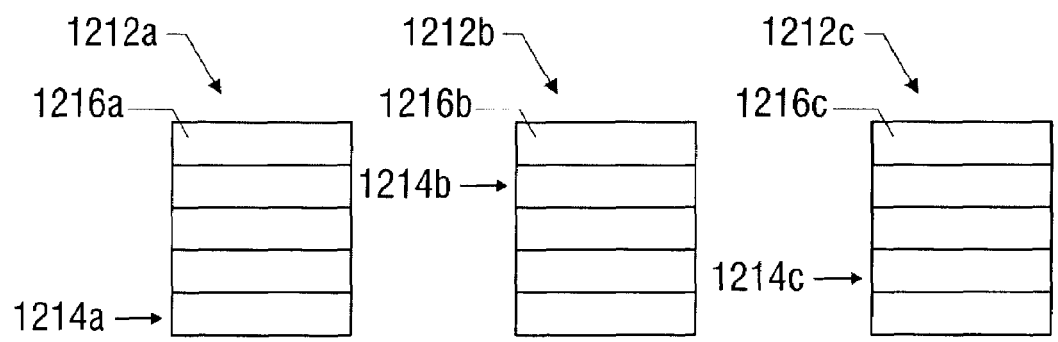
FIG. 12B is a snapshot of the buffers in an example of the alignment system of FIG. 7A upon or after a determination that the status indicators for all the buffers are set.

An example of the process of updating the write pointers and the common read pointer is illustrated in FIG. 12B. In this example, it is assumed that there are three streams of incoming data, and hence three separate buffers, identified respectively with numerals 1212a, 1212b, and 1212c. It is also assumed that the write pointers for each of the buffers, and the common read pointer, were each initialized to point to the first entry in each of the buffers, identified respectively with numerals 1216a, 1216b, and 1216c. It is further assumed that FIG. 12B provides a snapshot of the state of affairs in this arrangement upon determining that the status indicators for each of the buffers have all been set.

At this point, it is assumed that four entries have been written into buffer 1212a, one entry has been written into buffers 1212b, and three entries have been written into buffer 1212c. Hence, the write pointer for buffer 1212a, identified with numeral 1214a, points to the fifth entry from the top in buffer 1212a; the write pointer for buffer 1212b, identified with numeral 1214b, points to the second entry from the top in buffer 1212b; and the write pointer for buffer 1212c, identified with numeral 1214c, points to the fourth entry from the top in buffer 1212c.

Since the status indicators for each of the buffers has been set, the process of reading out groups of entries common to all the buffers may commence, starting with the first entry in each buffer, i.e., entries 1216a, 1216b, and 1216c, since that is the location pointed to by the read pointer.

Figure 13:
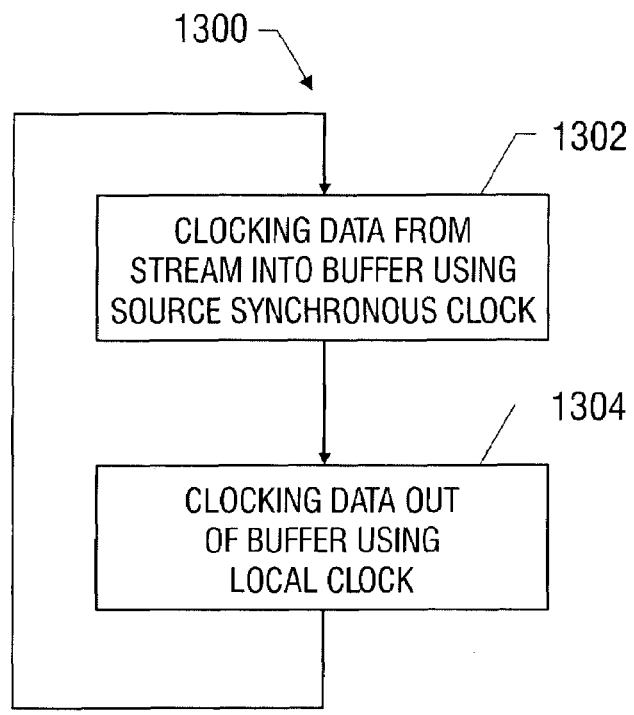
FIG. 13 is a flowchart of a method of re-timing a source synchronous data stream.

FIG. 13 is a flowchart of a method 1300 of re-timing a source synchronous stream of data. The method commences with step 1302, which comprises clocking data from the stream into a buffer using the source synchronous clock for the stream. Step 1302 is followed by step 1304, which comprises clocking data out of the buffer using a local clock. From step 1304, the method may then jump back to step 1302 for additional iterations.

In one embodiment, the method occurs in a networked system. In one implementation, the local clock is a master clock for the networked system, such as clock 414 in FIG. 4. In one example, the source synchronous clock is a DDR source synchronous clock, and the buffer is a FIFO buffer.

The FIFO buffer may have a read pointer and a write pointer. If so, the write pointer is updated as data is clocked into the buffer using the source synchronous clock, and the read pointer is also updated as data is clocked out of the buffer using the local clock.

The step of updating the write pointer may comprise incrementing the write pointer for each entry written into the buffer, and the step of updating the read pointer may comprise incrementing the read pointer for each entry read from the buffer.

Alternatively, the step of updating the write pointer may comprise decrementing the write pointer for each entry written into the buffer, and the step of updating the read pointer may comprise decrementing the read pointer for each entry read from the buffer.

Figure 14:
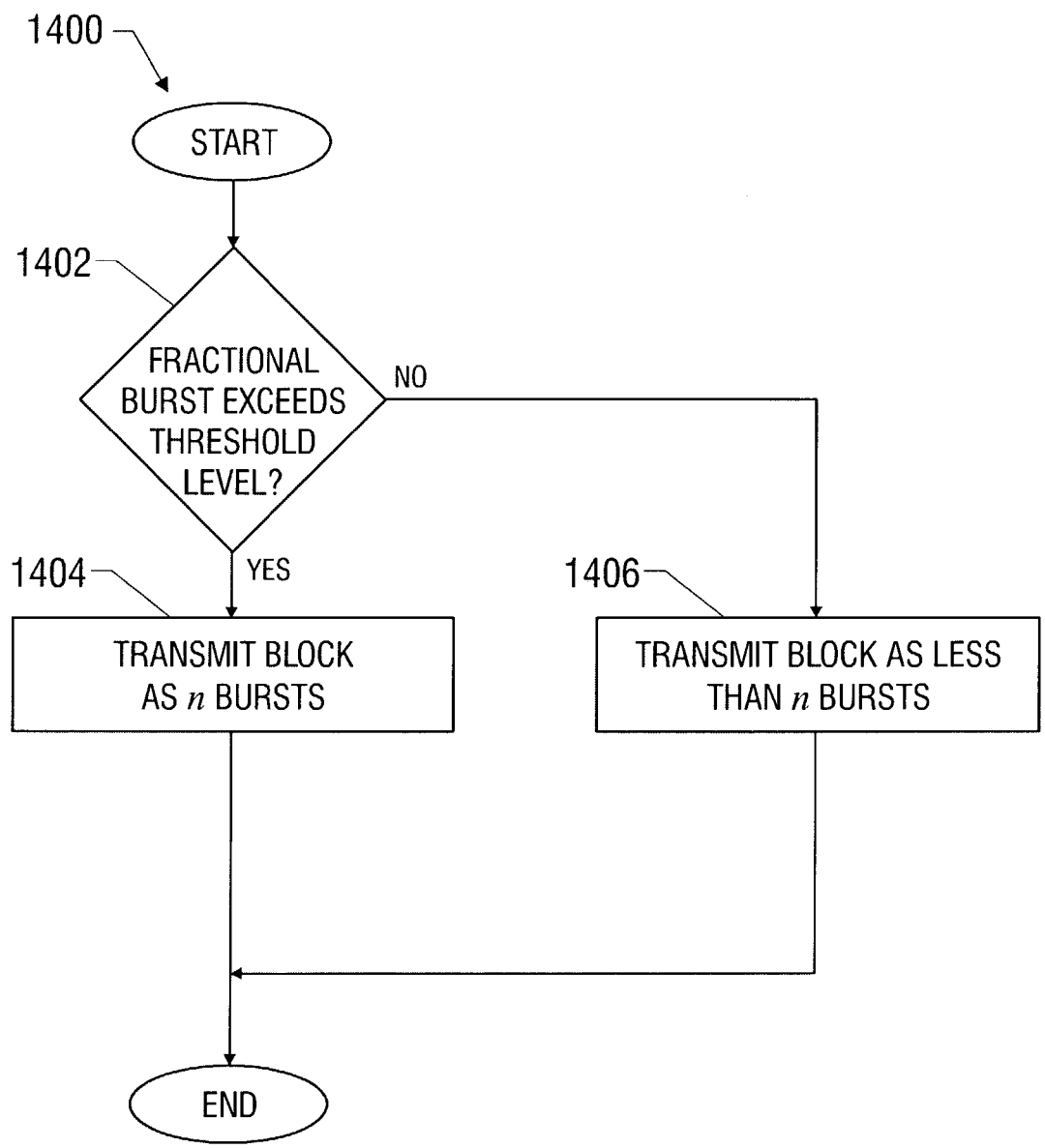
FIG. 14 is a flowchart of a method extending a burst transfer.

FIG. 14 is a flowchart of a method 1400 of selectively varying the number of burst transfers used to transmit a block of data. It is assumed that a block of data is desired to be transmitted from a sender to a receiver in a networked system, and it has been determined that the block is such as to require n bursts, where n is an integer of two or more, and that at least one of the bursts is a fractional burst, i.e., a burst in which the amount of data to be transmitted by the burst is less than one or more of the possible, normally-used sizes (or capacities) of a burst.

The method begins with inquiry step 1402. In inquiry step 1402, it is determined whether the size of the factional burst exceeds a threshold level. If so, step 1404 is performed. If not, step 1406 is performed.

In step 1404, the block of data is transmitted as n bursts. In step 1406, the block of data is transmitted as less than n bursts. Program control or method flow then terminates or exits.

In one embodiment, step 1406 comprises transmitting the block of data as n−1 bursts comprising n−2 bursts of a first predetermined size, and one burst having a second predetermined extended size equal to the first predetermined size plus an amount sufficient to accommodate the size of the fractional burst. In one implementation, data representative of the size of each of the bursts is also transmitted, as well as an indicator of whether the burst is of the second extended size.

In one example, the first predetermined burst size is 64 bytes, the second predetermined extended burst size is 80 bytes, and the threshold level is 16 bytes. In this example, step 1404 comprises transmitting the block as n bursts comprising (n−1) 64 byte bursts, and one burst having a predetermined size of either 32, 48, or 64 bytes, whichever is needed to accommodate the fractional burst as a standalone burst. Step 1406 comprises transmitting the block as (n−1) bursts comprising (n−2) 64 byte bursts, and one burst having a predetermined extended burst size of 80 bytes.

Figure 15:
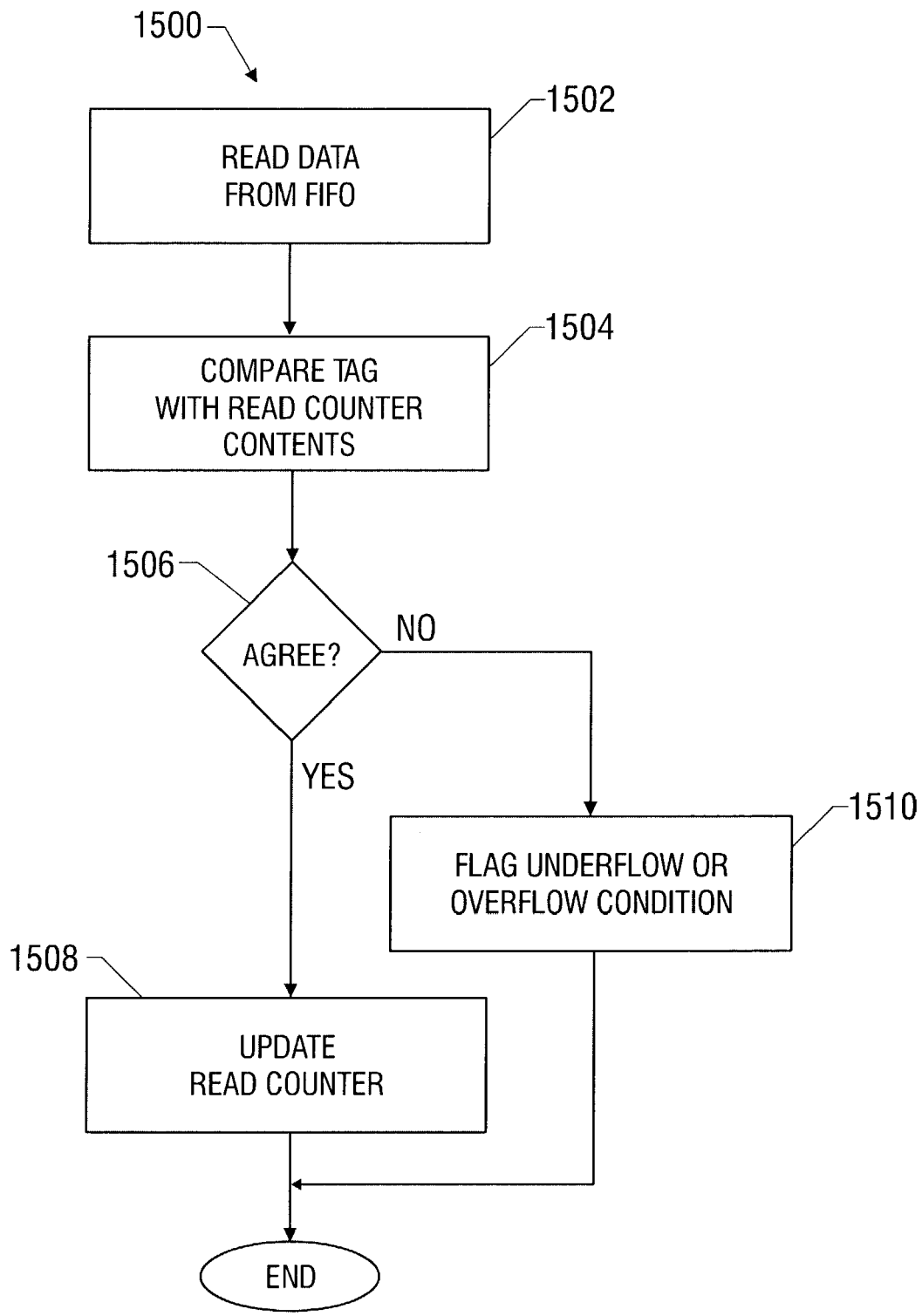
FIG. 15 is a flowchart of a counter-based method of detecting either or both underflow and overflow conditions in a circular buffer.

FIG. 15 is a flowchart of a method 1500 of detecting either or both underflow and overflow conditions of a circular buffer capable of holding n entries, wherein n is an integer of two or more, in which each entry of the buffer includes a tag portion.

In one embodiment, the method is incidental to the performance of a read operation from the buffer. In this embodiment, the method begins with step 1502, which comprises reading an entry from the buffer.

From step 1502, the method proceeds to step 1504, which comprises comparing the tag portion of the entry with the contents of a first counter configured to circularly count up to m values, where m is an integer less than n and not evenly divisible into n.

Inquiry step 1506 follows step 1504. In inquiry step 1506, it is determined whether the tag portion of the entry agrees with the contents of the first counter. If so, step 1508 is performed. If not, step 1510 is performed followed by step 1508.

Step 1508 comprises updating the contents of the first counter to reflect the read operation. Step 1510 comprises performing either or both of the following steps: (a) signaling an underflow condition if the tag value of the entry is less than the contents of the first counter, and (b) signaling an overflow condition if the tag portion of the entry is greater than the contents of the first counter.

From step 1508, program control or method flow exits or terminates.

In one embodiment, the method 1500 further comprises performing a write operation. In one embodiment, the process of performing a write operation comprises forming an entry to be written to the buffer, the tag portion of the entry representative of the contents of a second counter configured to circularly count up to m entries; writing the entry to the buffer; and updating the contents of the second counter.

In one implementation, the step of updating the contents of the first counter during a read operation comprises incrementing it, and the step of updating the contents of the second counter during a write operation comprises incrementing it.

In another implementation, the step of updating the contents of the first counter during a read operation comprises decrementing it, and the step of updating the contents of the second counter during a write operation comprises decrementing it.

In one implementation example, the circular buffer is a FIFO buffer.

The methods of FIGS. 11-15, and any of the embodiments, implementations and examples which have been discussed, may be implemented through software, hardware, or any combination of hardware and software. In relation to the software implementation, the methods may be embodied in the form of software instructions stored in a memory. Furthermore, this memory may be accessible by a processor in a system, wherein the processor is configured to successively retrieve and execute the software instructions.

While various embodiments of the invention have been described, it will be apparent to those of ordinary skill in the art that many more embodiments and implementations are possible that are within the scope of this invention.

What is claimed is:

1. A system for aligning a plurality of source synchronous streams of data comprising:
   a buffer corresponding to each of the streams of data;
   a status indicator corresponding to each of the streams of data, the status indicator indicating whether or not data for the corresponding stream has begun to be clocked into the corresponding buffer;
   first logic for clocking data from a stream into the corresponding buffer using a source synchronous clock for the stream, and setting the status indicator for the stream to indicate that data for the stream has begun to be clocked into the corresponding buffer; and
   second logic for checking the status indicators, and upon or after determining that data for all of the streams has begun to be clocked into the corresponding buffers, clocking data out of each of the buffers using a local clock common to all the buffers.

2. The system of claim 1 wherein the buffers are first-in-first-out (FIFO) buffers.

3. The system of claim 2 wherein each of the FIFO buffers has a write pointer, a read pointer is common to all the buffers, and the first logic is configured to update the write pointer for a buffer as data for a stream is clocked into the buffer using the source synchronous clock for the stream, and the second logic is configured to update the read pointer common to all the buffers as data is clocked out of the buffers using the local clock.

4. The system of claim 1 wherein the source synchronous clocks are double data rate (DDR) source synchronous clocks.

5. The system of claim 1 embodied in a receiver of data in a networked system.

6. In a networked system, a system for re-timing a source synchronous stream of data comprising:
   a buffer having an output stream;
   first logic for clocking first and second adjacent data from the source synchronous stream into the buffer using a source synchronous clock for the stream; and
   second logic for clocking the first and second adjacent data out of the buffer to the output stream using a local clock,
   wherein the source synchronous clock is a double data rate (DDR) source synchronous clock, which samples the data on both rising and falling edges.

7. The re-timing system of claim 6 wherein the buffer is a FIFO buffer.

8. The re-timing system of claim 7 wherein the FIFO buffer has a read pointer and a write pointer, and the first logic is configured to update the write pointer as data from the source synchronous stream is clocked into the buffer using the source synchronous clock for the stream, and the second logic is configured to update the read pointer as data is clocked out of the buffer using the local clock.

9. The re-timing system of claim 6 is embodied in a receiver of data in the networked system.

10. A method of aligning a plurality of source synchronous streams of data comprising the steps of:
    clocking data from each of the streams into a corresponding buffer using a source synchronous clock for the stream, and setting a status indicator for the stream to indicate that data for the stream has begun to be clocked into the corresponding buffer; and
    checking the status indicators, and upon or after determining that data for all of the streams has begun to be clocked into the corresponding buffers, clocking data out of each of the buffers using a local clock common to all the buffers.

11. The method of claim 10 wherein the source synchronous clocks are double data rate (DDR) source synchronous clocks.

12. The method of claim 10 wherein the buffers are FIFO buffers each having a write pointer, and wherein there is a read pointer is common to all the buffers, the method further comprising:
    updating the write pointer for a buffer as data for a stream is clocked into the buffer using the source synchronous clock for the stream; and
    updating the read pointer common to all the buffers as data is clocked out of the buffers using the local clock.

13. The method of claim 12 wherein the step of updating the write pointer comprises incrementing the write pointer, and the step of updating the read pointer comprises incrementing the read pointer.

14. The method of claim 12 wherein the step of updating the write pointer comprises decrementing the write pointer, and the step of updating the read pointer comprises decrementing the read pointer.

15. In a networked system, a method of re-timing a source synchronous stream of data comprising the steps of:
  clocking first and second adjacent data from the source synchronous stream into a buffer using a source synchronous clock for the source synchronous stream, the buffer having an output stream; and
  clocking the first and second adjacent data out of the buffer to the output stream using a local clock,
  wherein the source synchronous clock is a DDR source synchronous clock, which samples the data on both rising and falling edges.

16. The method of claim 15 wherein the buffer is a FIFO buffer.

17. The method of claim 16 wherein the FIFO buffer has a read pointer and a write pointer, and the method further comprises:
  updating the write pointer as data from the source synchronous stream is clocked into the buffer using the source synchronous clock for the source synchronous stream; and
  updating the read pointer as data is clocked out of the buffer using the local clock.

18. The method of claim 17 wherein the step of updating the write pointer comprises incrementing the write pointer, and the step of updating the read pointer comprises incrementing the read pointer.

19. The method of claim 17 wherein the step of updating the write pointer comprises decrementing the write pointer, and the step of updating the read pointer comprises decrementing the read pointer.

20. A system for managing source synchronous data transfers between a sender and receiver of data interconnected by a bus in a networked system comprising:
  means for buffering a stream of source synchronous data, the means for buffering capable of holding n entries, wherein n is an integer of two or more, and each entry has a tag portion;
  means for clocking data from the stream into the buffer using a source synchronous clock for the stream;
  means for clocking data out of the means for buffering using a local clock;
  means for circularly counting through m values, wherein m is an integer less than n and is not evenly divisible into n; and
  means for performing a read operation by (1) reading an entry from the means for buffering, (2) comparing the tag portion of the entry with the contents of the means for circularly counting, (3) either or both (a) signaling an underflow condition if the tag portion of the entry is less than the contents of the means for circularly counting, and (b) signaling an overflow condition if the tag portion of the entry exceeds the contents of the means for circularly counting, and (4) otherwise updating the contents of the means for circularly counting to reflect the read operation.

21. The system of claim 20 wherein the means for buffering comprises a means for buffering each of a plurality of streams of source synchronous data, and the system further comprises:
  means for indicating whether or not data for each of the streams has begun to be clocked into the means for buffering;
  means for clocking data from a stream into the means for buffering using the source synchronous clock for the stream, and setting the means for indicating to indicate that data for the stream has begun to be clocked into the means for buffering; and
  means for checking the means for indicating, and upon or after determining that data for all of the streams has begun to be clocked into the means for buffering, clocking data for all the streams out of means for buffering using a local clock common to all the streams.

22. A method of managing source synchronous data transfers between a sender and receiver of data interconnected by a bus in a networked system, the method comprising:
  a step for clocking data from a source synchronous stream into a means for buffering using a source synchronous clock for the stream, the means for buffering capable of holding n entries, wherein n is an integer of two or more, and each entry having a tag portion;
  a step for clocking data out of the means for buffering using a local clock;
  a step for reading an entry from the means for buffering;
  a step for comparing the tag portion of the entry with the contents of a means for circularly counting through m values, where m is an integer less than n and not evenly divisible into n;
  a step for either or both (a) signaling an underflow condition is the tag portion of the entry is less than the contents of the means for circularly counting, and (b) signaling an overflow condition if the tag portion of the entry is greater than the contents of the means for circularly counting; and
  a step for updating the contents of the means for circularly counting if the contents of the means for circularly counting equals the tag portion of the entry.

23. The method of claim 22 further comprising:
  a step for clocking data from each of a plurality of source synchronous streams into the means for buffering using, for a particular stream, the source synchronous clock for that stream, and also setting a means for indicating to indicate that data for the stream has begun to be clocked into the means for buffering; and
  a step for checking the means for indicating, and upon or after determining that data for all of the streams has begun to be clocked into the means for buffering, clocking data for each of the streams out of the means for buffering using a local clock common to all the streams.

24. The system of any of claims 1, 3, 20 or 21, wherein the local clock is a master clock for the system.

25. The method of any of claims 10, 12, 22 or 23, wherein the local clock is a master clock.

26. The re-timing system of claim 6 wherein the local clock is a master clock for the networked system.

27. The method of claim 15 wherein the local clock is a master clock for the networked system.

* * * * *